US011479365B2

(12) United States Patent
Chen et al.

(10) Patent No.: US 11,479,365 B2
(45) Date of Patent: Oct. 25, 2022

(54) COMPUTER VISION SYSTEMS AND METHODS FOR AIDING LANDING DECISION

(71) Applicant: HONEYWELL INTERNATIONAL INC., Charlotte, NC (US)

(72) Inventors: Zhong Chen, Beijing (CN); Gang He, Morristown, NJ (US); Min Wu, Beijing (CN); Carl Dins, Tempe, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/155,983

(22) Filed: Jan. 22, 2021

(65) Prior Publication Data
US 2022/0234752 A1 Jul. 28, 2022

(51) Int. Cl.
*B64D 43/00* (2006.01)
*H04L 67/12* (2022.01)
(Continued)

(52) U.S. Cl.
CPC ............ *B64D 43/00* (2013.01); *B64D 45/00* (2013.01); *B64D 45/08* (2013.01); *G05D 1/106* (2019.05);
(Continued)

(58) Field of Classification Search
None
See application file for complete search history.

(56) References Cited

U.S. PATENT DOCUMENTS 6,157,876 A 12/2000 Tarleton, Jr. et al.
7,908,078 B2 * 3/2011 He .................. G01C 23/005
340/972
(Continued)

FOREIGN PATENT DOCUMENTS

CN 104484870 A 4/2015
EP 2765389 A1 8/2014
(Continued)

OTHER PUBLICATIONS

"How Wayfinder is Using Neural Networks for Vision-Based Autonomous Landing," Jul. 10, 2019, downloaded from https://acubed.airbus.com/blog/wayfinder/how-wayfinder-is-using-neural-networks-for-vision-based-autonomous-landing/ on Oct. 22, 2020.
(Continued)

*Primary Examiner* — Reza Aghevli
(74) *Attorney, Agent, or Firm* — Lorenz & Kopf, LLP

(57) ABSTRACT

The present disclosure provides computer vision systems and methods for an aircraft. The computer vision systems and methods identify a runway based on video frame data from a camera mounted to the aircraft, extract runway pixel positions associated with the runway, determine the aircraft position in a real world coordinate frame based on the pixel positions, the aircraft position including an aircraft lateral position and an aircraft elevation, receive predefined aircraft position data and go-around rules for a compliant approach to the runway, calculate an aircraft position deviation based on the aircraft position and the predefined aircraft position data, determine whether the aircraft position deviation is in conformance with the go-around rules, and output an indication of conformity with the go-around rules.

17 Claims, 2 Drawing Sheets

(51) Int. Cl.
  *G06T 7/73* (2017.01)
  *B64D 45/08* (2006.01)
  *G05D 1/10* (2006.01)
  *B64D 45/00* (2006.01)
  *G06V 10/22* (2022.01)
  *G06V 20/13* (2022.01)

(52) U.S. Cl.
  CPC ............... *G06T 7/73* (2017.01); *G06V 10/22* (2022.01); *G06V 20/13* (2022.01); *H04L 67/12* (2013.01); *B64D 2045/0075* (2013.01); *G06T 2207/10016* (2013.01); *G06T 2207/10032* (2013.01)

(56) References Cited

U.S. PATENT DOCUMENTS

| | | | |
|---|---|---|---|
| 8,284,997 B2 | 10/2012 | Ibrahim et al. | |
| 8,446,468 B1* | 5/2013 | Medioni | G06V 20/56 348/144 |
| 8,462,205 B2* | 6/2013 | Soler | G08G 5/0021 348/115 |
| 8,594,916 B2* | 11/2013 | He | G08G 5/0021 340/972 |
| 9,024,805 B1 | 5/2015 | Jinkins et al. | |
| 9,260,180 B2 | 2/2016 | Puyou et al. | |
| 9,384,586 B1* | 7/2016 | McCusker | G06T 15/20 |
| 10,249,094 B2* | 4/2019 | Ganille | G08G 5/025 |
| 10,410,529 B2 | 9/2019 | Chiodini et al. | |
| 10,597,168 B2* | 3/2020 | Boada-Bauxell | G08G 5/025 |
| 2007/0088491 A1* | 4/2007 | He | G08G 5/025 701/120 |
| 2010/0321488 A1* | 12/2010 | Soler | G08G 5/0021 348/115 |
| 2011/0022291 A1* | 1/2011 | He | G08G 5/0021 701/120 |
| 2013/0329052 A1* | 12/2013 | Chew | G08G 5/065 348/159 |
| 2017/0287224 A1* | 10/2017 | Ganille | G01S 13/913 |
| 2018/0061243 A1* | 3/2018 | Shloosh | G08G 5/0043 |
| 2018/0118372 A1* | 5/2018 | Boada-Bauxell | G08G 5/025 |
| 2018/0127111 A1* | 5/2018 | Feyereisen | G08G 5/025 |
| 2019/0235523 A1* | 8/2019 | Rozenberg | G06V 20/00 |
| 2021/0158157 A1* | 5/2021 | Ganille | G06N 3/08 |
| 2021/0371125 A1* | 12/2021 | Courbun | G06T 7/73 |

FOREIGN PATENT DOCUMENTS

| | | |
|---|---|---|
| EP | 3073225 A1 | 9/2016 |
| EP | 3709116 A1 | 9/2020 |

OTHER PUBLICATIONS

Watanabe, Yoko, et al., Preliminary Validation Results of Vision-Based Navigation Techniques, Apr. 30, 2018, Technical Note D4.7, NEDO GA-0628001.

* cited by examiner

COMPUTER VISION SYSTEMS AND METHODS FOR AIDING LANDING DECISION

TECHNICAL FIELD

The present disclosure generally relates to systems and methods for providing assistance to deciding whether to go-around or continue a landing approach.

BACKGROUND

Landing an aircraft is one of the most demanding maneuvers performed during flight. When landing an aircraft, a pilot needs to make a decision of "continue approach" or "go-around" at a minimum decision height. This can be a challenging task and the pilot is required to make the decision within a short time period. In making the decision as to whether to continue the approach or to go-around, the pilot should be able to clearly see the landing environment for the approaching runway. The pilot should also check other conditions in order to continue landing, such as lateral and glideslope deviation, and must maintain with a range to complete the landing task. If the aircraft flies too high or too low, or if the aircraft is not aligned with a center of a target runway, a go-around should be considered even if the pilot is able to make visual contact with the runway. Whilst pilots are trained to consider the various factors when deciding upon a go-around, it remains a matter of pilot judgement as to whether the aircraft is too high or too low, too left or too right for landing tasks with visual confirmation requirements. The effectiveness of a pilot in safely landing the aircraft depends on the experience and judgment of the pilot. Pilots with varying levels of experience and training may respond differently to the same situation, and some pilot responses may provide a less than optimal landing. Further, the decision to go-around or continue a landing approach places a cognitive burden on the pilot during an already strenuous flight sector.

Accordingly, an object of the present disclosure is to provide a landing aid for an aircraft and associated methods using processing efficient software and existing hardware for many aircraft. The landing aid assists a pilot in deciding whether to go-around or continue an approach whilst ensuring compliance with a requirement for visual contact with the target runway. The landing aid may make the go-around or continue decision faster and better than many human pilots. Furthermore, other desirable features and characteristics of the disclosure will become apparent from the subsequent detailed description and the appended claims, taken in conjunction with the accompanying drawings and this background of the disclosure.

BRIEF SUMMARY

The present disclosure provides computer vision systems and methods for an aircraft. The computer vision systems and methods identify a runway based on video frame data from a camera mounted to the aircraft, extract runway pixel positions associated with the runway, determine the aircraft position in a real world coordinate frame based on the pixel positions, receive predefined aircraft position data and go-around rules for a compliant approach to the runway, calculate an aircraft position deviation based on the aircraft position and the predefined aircraft position data, determine whether the aircraft position deviation is in conformance with the go-around rules, and output an indication of conformity with the go-around rules.

This summary is provided to describe selected concepts in a simplified form that are further described in the Detailed Description. This summary is not intended to identify key or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
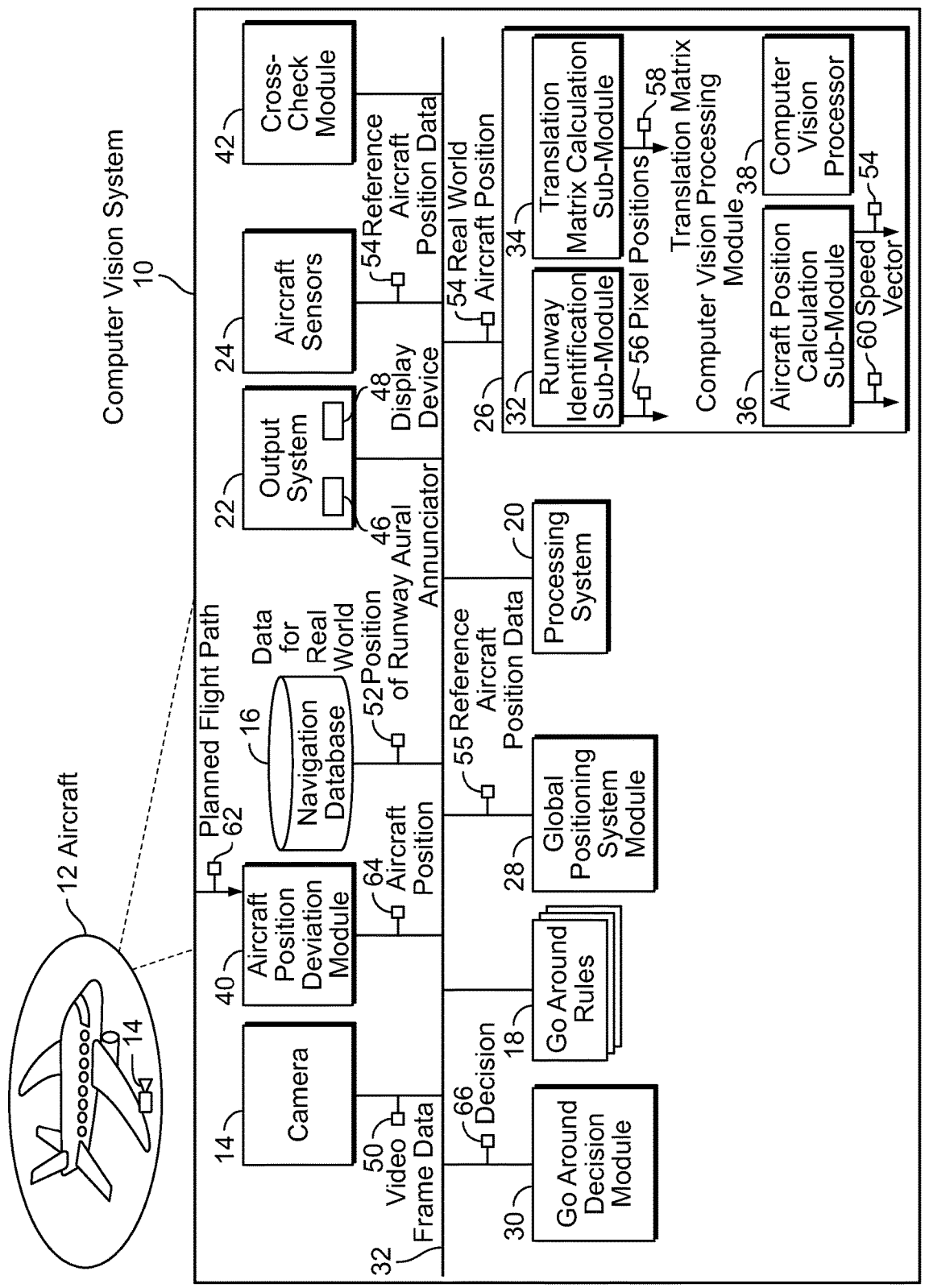
FIG. 1 is a schematic diagram of a computer vision system for assisting a landing decision, in accordance with the present disclosure.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, brief summary, or the following detailed description.

Methods described herein include a camera mounted to an aircraft that outputs video frame data to a computer vision processor. The computer vision processor identifies a position of the runway in image space and determines a transformation function to the runway position in real world space based on data obtained from a navigation database. The transformation function can then be applied to the runway position in real world space to determine the camera position in real space, which can be used to determine the aircraft position. Using the determined aircraft position, a continue approach or go-around decision is made. The decision is additionally based on predefined go-around rules and predefined aircraft position data that is determined based on the planned aircraft path to the target runway.

The present disclosure provides systems and methods using a camera (e.g. a monocular camera) and a computer vision processor to compute aircraft a position (and optionally also speed) vector relative to a target runway in real-time. The systems and methods further compute aircraft position deviation from a current planned flight path, which provides predefined aircraft position data. In an Instrument Landing System (ILS) approach, the planned flight path is a predefined GS (Glide Scope) and LOC (Localizer) path. In a Localizer Performance with Vertical guidance (LPV) approach, there is a predefined virtual glide path to a target runway control point. The systems and methods compare the calculated aircraft position from predefined aircraft position. The systems and methods announce an indication of conformity with go-around rules to the pilot, which can be a final decision as to whether to continue approach or to go-around. The systems and methods may include a process for cross checking the determined aircraft position (e.g. latitude, longitude and altitude) and optional speed vector (both horizontal and vertical) calculated by the computer vision processor against data coming out of aircraft sensors such as a global positioning system (GPS).

The systems and methods described herein can provide a more accurate go-around decision in that computer/machine decision making based on computer vision processing and a predefined algorithm can be more accurate and consistent than a human decision based on pilot experiences. The integrity of the decision is assured as it relies on visual contact of the camera with the runway and may further include a cross-check feature. If the cross-check output is negative, the systems and methods will declare failure and not generate further guidance and annunciations. The computer vision algorithm can complete object detection (runway detection in this case) and other required calculations for positioning and decision making much faster than a human decision could usually be made.

FIG. 1 depicts an exemplary embodiment of a computer vision system 10 associated with, or included within, an aircraft 12. This embodiment of the system 10 includes, without limitation, a camera 14, a navigation/airport database 16, a processing system 20, an output system 22, aircraft sensors 24, a computer vision processing module 26, a global positioning system (GPS) module 28, an aircraft position deviation module 40, go-around rules 18, a go-around decision module 30 and a cross-check module 42. It should be understood that FIG. 1 is a simplified representation of the computer vision system 10, and FIG. 1 is not intended to limit the application or scope of the subject matter in any way. In practice, the system 10 and/or the aircraft 12 will include numerous other devices and components for providing additional functions and features, as will be appreciated in the art.

In some embodiments, the aircraft 12 is a fixed wing aircraft or a rotorcraft or a UAV with remote piloting data link. The aircraft may be a passenger or cargo aircraft and can be any of various dimensions and weight capacities. The aircraft 12 has a camera 14 mounted thereon. In the depicted embodiment, the camera 14 is mounted to the wing of the aircraft 12, but embodiments are contemplated in which the camera 14 is mounted to the fuselage of the aircraft 12. Rather than being laterally displaced as in the exemplary embodiment, the camera 14 may be located along a central longitudinal axis of the aircraft 12.

In embodiments, the camera 14 is a monocular digital camera, although other types of camera 14 are contemplated. Other vision cameras are possible including stereo cameras, infrared cameras, etc. The camera 14 can include a plurality of cameras including combinations of different types of cameras such as those described above. The images are generated via single camera or real-time fusion of multiple cameras. The resolution of the camera may be no less than WUXGA resolution (1920×1080 pixels) or application dependent for pixel feature extractions The camera 14 is mounted on the front of aircraft 12 so as to provide a front view of a scene ahead of the aircraft 12 that will encompass a target runway at a decision height for the aircraft 12. The camera 14 may be mounted on a center of the front of a nose of the aircraft or may be laterally offset. As will be described further herein, any lateral offset can be factored in by the computer vision processing module 26. In one exemplary embodiment, the camera 14 has a 50 mm lens, which translates to a field of view of 39.6 (deg) and 27.0 (deg) on X and Y axis, respectively, for an FX formatted image sensor (36×24 mm). In the exemplary embodiment, the camera 14 is mounted with a certain range of pitch angle measured with respect to the aircraft body longitudinal axis. Given the aircraft gliding path is often 3 degrees, a normal pitch angle of −2 degrees of the aircraft during approach, a vertical FOV of the 50 mm lens is 27 degrees and the camera mounting pitch angle should be 6 or 7 degrees.

In embodiments, the camera 14 produces video frame data 50 that can include a target runway. The format of the video frame data 50 could be 8 bits depth grayscale data with a resolution of 1920×1080. However, greater sensitivity (bits) or color data could also be provided by the camera 14. The video frame data 50 is provided to the computer vision processing module 26 for processing to identify the target runway and from that to determine a real world position of the aircraft 12.

In accordance with various embodiments, the computer vision system 10 includes a navigation database 16 that stores navigation data used by various avionics systems. The navigation database 16 provides data 52 for the real world position of a target runway. The target runway may be established by a flight plan from a flight management system (FMS) or selected by a pilot or derived based on a location of the aircraft 12 from the GPS module 28. The navigation database 16 can be interrogated to determine data points representing the target runway in a real world coordinate frame. The navigation database 16 may, alternatively, be a dedicated airport runway database. The navigation database 16 may be stored digitally in an airborne avionics computer. For example, many modern aircraft 12 have an FMS and a navigation database that contains runway location data. The navigation database may be updated regularly through wired or wireless data connections. The data 52 provided by the navigation database 16 may include a runway centerline, a length of the runway, a width of the runway, coordinates for corner points of the runway, coordinates for a center point of the runway and other data describing dimensions and location of the runway. The coordinates may be relative to the runway or in a global coordinate frame, both of which are in a real world coordinate frame rather than an image space coordinate frame. The data 52 can be combined with corresponding data in image space extracted by the computer vision processing module 26 in order to determine a translation matrix that is used in subsequent processing to derive the aircraft position in the real world coordinate frame.

In accordance with various embodiments, the computer vision system 10 includes the aircraft sensors 24 and the GPS module 28. The aircraft sensors 24 include at least an inertial measurement unit (IMU). The GPS module 28 may include a Global Positioning System (GPS) or global navigation satellite system (GNSS) receiver. The IMU includes one or more gyroscopes and accelerometers. The aircraft sensors 24 and the GPS module 28 individually or in combination determines location (and optionally also orientation information) for the aircraft 12. The GPS module 28 determines location data based on global position data obtained from satellites, e.g. by trilateration with three or more satellites and based on inertial measurements. In some embodiments, the GPS module 28 determines location of the aircraft 12 based on Wide Area Augmentation System (WAAS) or other augmented satellite-based global position data. A network of ground-based reference stations provides measurements of small variations in the GPS satellites' signals so that onboard GPS or GNSS receivers use the corrections while computing their positions to improve accuracy of location measurements. The IMU of the aircraft sensors 24 may additionally or alternatively allow the global position and orientation of the aircraft to be derived. The aircraft sensors 24 and/or the GPS module 28 outputs reference aircraft position data 55, which can be used in a cross-check process to determine whether the real world aircraft position 54 determined by the computer vision processing module 26 is reasonable.

In an exemplary embodiment, the computer vision system 10 includes an output system 22 including at least one of an aural annunciator 46 and a display device 48. The output system 22 receives a go-around decision 66 and indicates the go-around decision 66 to the pilot. The indication may be an aural annunciation such as a tone or a text/command to speech output. Additionally or alternatively, a graphical or textual indication of the go-around decision 66 may be displayed on the display device 48. The indication may be output for only a decision to go-around, for only a decision to continue approach or different indications may be output to indicate both decisions. In another possibility, an indicator light may be included on an instrument panel of the aircraft 12. The aural annunciator 46 and the display device 48 are located in a cockpit of the aircraft 12. In embodiments, the display device 48 includes a head down display (HDD), a head up display (HUD), a wearable HUD, a portable display or any combination thereof. The display device 48 may be dashboard/cockpit integrated display or an Electronic Flight Bag (EFB) device. The aural annunciator may include a cockpit integrated speaker or may be included in a headset of the pilot.

System 10 further includes the processing system 20 including one or more processors that are configured to execute computer programming instructions stored on non-transitory memory (not shown). Functions of the computer vision system 10 and steps of the method 200 (FIG. 2) are executed by one or more processors of the processing system 20 and the associated computer programming instructions. Modules, sub-modules and the processing system 20 as described herein refer to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

The computer vision processing module 26 includes a runway identification sub-module 32, a translation matrix calculation sub-module 34, an aircraft position calculation sub-module and a computer vision processor 38. The computer vision processor 38 may be a dedicated processor adapted for image processing operations or the computer vision processor 38 may be a general purpose processor included in the processing system 20. The computer vision processor 38 executes programming instructions that cause the at least one processor to execute the functions and steps of the computer vision processing module 26 as described herein.

The runway identification sub-module 32 processes the video frame data 50 and executes an object finding function or algorithm tuned to identify a runway in the video frame data 50. Numerous runway detection algorithms could be constructed. In one example, a machine learning classifier is used that is trained with images including a runway. One example classifier is the Cascade Classifier. However, it should be appreciated that a classical image processing approach could be used, which does not rely on machine learning algorithms. For example, feature or pattern matching algorithms could be used to identify the runway. The object finding function returns a positive or negative indication concerning whether a runway has been found and returns a region of interest (ROI) outline (e.g. a rectangle) encompassing the identified runway. The ROI may be a little larger and contain the convex hull of the runway. The runway identification sub-module 32 further processes, e.g. by contrast filtering and/or edge detection, the ROI to determine runway pixel positions (or other location data in image space) 56 describing the location of the runway in image space. In one embodiment, three or four corner points of the runway in image or pixel coordinates are output by the runway identification sub-module 32.

The translation matrix calculation sub-module 34 receives the pixel positions 56 in two dimensional image coordinates (e.g. x and y). The translation matrix calculation sub-module 34 determines a translation matrix 58 for transforming the position the position of the runway in real world coordinates to a position of the camera 14 in real world coordinates. The translation matrix 58 is determined based on intrinsic parameters of the camera 14, the pixel positions 56 and the data 52 for real world position of the runway. The translation matrix 58 represents a transformation from camera coordinates to real world coordinates. If the translation matrix 58 is known, it is possible to determine the position of the camera (and thus the real world aircraft position 54) from the data 52.

In one embodiment, the translation matrix calculation sub-module 34 solves the following equation:

$$q = MWQ \qquad \text{(equation 1)}$$

In equation 1, M is the camera intrinsic matrix including focus length $f_x$, $f_y$ and center of image offset $c_x$, $c_y$:

$$M = \begin{bmatrix} f_x & 0 & c_x \\ 0 & f_y & c_y \\ 0 & 0 & 1 \end{bmatrix} \qquad \text{(equation 2)}$$

In equation 1, W=(R, t), wherein R is a rotation matrix (e.g. a 3 by 1 rotation matrix in Rodrigues transform format) and t is the translation matrix 58. Q is the data 52 for real world position of the runway as a three dimensional space vector (X, Y, Z) in the form of a 3 by 1 matrix. The data 52 can be in the global coordinates, in local airport coordinates or in coordinates relative to the runway. The data 52 may be three or four corners of the runway in some embodiments but other trackable features of the runway may be used provided the location of corresponding features can be extracted by the computer vision processing module 26. In equation 1, q are the pixel positions 56 as a 2 by 1 matrix representing the computer vision determined points of the runway in camera body coordinates.

The translation matrix calculation sub-module 34 solves equation 1 with respect to the translation matrix 58 based on the following operation:

$$t = M^{-1} * q * Q^{-1} - R \qquad \text{(equation 3)}$$

A detailed example of the operations by translation matrix calculation sub-module 34 will now be provided. Given M (3×3 Camera intrinsic Matrix), q (2×1 pixel positions 56 on the camera 14), Q (3×1 runway position of the pixel in runway/real world coordinates) and R (rotation matrix of the camera 14), the t matrix is solved based on intrinsic camera parameters, the pixel positions 56 for the runway determined by computer vision processing of the video frame data 50 and the known position of the runway based on the data 52 for the real world position of the runway.

For a 50 mm lens of an FX format image sensor (36*24 mm), the camera intrinsic matrix M is, in the present example:

$$M = \begin{bmatrix} 889 & 0 & 64 \\ 0 & 1000 & 0 \\ 0 & 0 & 1 \end{bmatrix}$$

For Q, the runway threshold position is taken for the position of the runway and the length of the runway is retrieved from the navigation database 16. In this example:

$$Q = \begin{bmatrix} \frac{\text{Runway length}}{2} \\ 0 \\ 0 \end{bmatrix}$$

For R, it is assumed that the aircraft 12 is aligned with the runway and the camera 14 has its light axis (longitudinal x axis) parallel with a longitudinal axis of the body of the aircraft 12, has a downward pitch (including the pitch of the aircraft 12) of 8° and there is no rotation on any other axis. In this example:

$$R = \begin{bmatrix} 0.13962634 \\ 0 \\ 0 \end{bmatrix}$$

Equation 3 can thus be solved based on the pixel positions 56 coming from the runway identification sub-module 32 to derive t. In this simplified example, the pixel positions correspond to the runway threshold point in the camera image in x, y form. However, in more complicated examples, the R matrix is also unknown such that additional runway points are required to solve both R and t. Optimally, at least 3 non-relative points (not on a straight line) are included in the pixel positions. In embodiments described herein, three or four corner points for the runway are used to solve for R and t based on corresponding corner points for the runway included in the data 52 taken from the navigation database 16.

The translation matrix 58 is received by the aircraft position calculation sub-module 36 and processed to derive a position of the camera 14 and, based thereon, the real world aircraft position 54. The camera position is calculated based on the translation matrix 58 as follows:

$$\text{Pos}_{camera} = \text{Pos}_{runway} - t \quad \text{(equation 4)}$$

The aircraft position can be determined based on the camera position by taking into account any lateral, and optionally also, height differential between the camera 14 and a center point of the aircraft 12. Specifically:

$$\text{Pos}_{aircraft} = \text{Pos}_{camera} - t_{installation} \quad \text{(equation 5)}$$

$t_{installation}$ is a matrix representing spatial offset of the aircraft 12 from lateral, and optionally also, longitudinal and height axes of the aircraft 12. The aircraft position calculation sub-module 36 may also determine a speed vector 60 for the aircraft based on a time derivative of the real world aircraft position 54. The speed vector 60 can be used as an additional variable for the cross-checking process described in the following.

The computer vision system 10 includes an aircraft position deviation module 40 that received a planned flight path 62 and the real world aircraft position 54. The planned flight path 62 can be obtained from ILS data or from an FMS. The planned flight path 62 includes a desired glide slope and a desired position laterally with respect to the target runway. The planned flight path 62 thus provides predefined aircraft position data. The aircraft position deviation module 40 compares the real world aircraft position 54 and the planned flight path 62 and determines a deviation therebetween in the form of an aircraft position deviation 64. More specifically, the aircraft position deviation module 40 determines an aircraft position deviation with respect to the Glide Slope (GS) and the Localizer (LOC) in the planned flight path 62. The glide slope deviation $D_{GS}$ is:

$$D_{GS} = Z_{POS} - Z_{GS} \quad \text{(equation 6)}$$

In equation 6, $Z_{POS}$ is the Z value in the matrix of the real world aircraft position 54. $Z_{GS}$ is determined based on the glide slope angle ($\theta_{GS}$) from the planned flight path 62, namely:

$$Z_{GS} = Y_{POS} * \tan(\theta_{GS}) \quad \text{(equation 7)}$$

The localizer or lateral deviation ($D_{LOC}$) is determined based on:

$$D_{LOC} = X_{POS} - X_{LOC} \quad \text{(equation 8)}$$

In equation 7, $X_{POS}$ is the X value in the matrix of real world aircraft position 54 and $X_{LOC}$ is taken from the planned flight path 62.

The computer vision system 10 includes a go-around decision module 30 that references go-around rules 18 to issue a decision 66 as to whether the aircraft 12 should continue the landing approach or to go-around. The go-around decision module 30 may become active when approaching a minimum decision altitude (MDA), e.g. within a predetermined distance or time from the MDA or after descending past a fixed or variably calculated altitude during a landing approach. Alternatively, the go-around decision module 30 may be active throughout a landing approach section of a flight plan or during a defined portion thereof. The go-around decision module 30 may cease continues operation of the processes described herein at/after descending through the MDA, e.g. within a predetermined distance or time after passing the MDA and before touchdown.

Alternatively, the go-around decision module 30 may cease operation at a fixed or variably calculated height. The MDA varies depending on the category of the aircraft 12 and some other factors and is available in reference information accessible by the FMS. For CAT 1 aircraft, the MDA is greater than or equal to 200 feet (60 m). For CAT II aircraft, the MDA is greater than or equal to 100 feet. For CAT III aircraft, the MDA may be less than 100 feet or there may be no MDA. The go-around rules 18 may be defined by an aviation authority, by the aircraft carrier or by a system provider. The go-around rules 18 define maximum deviations from the planned flight path 62. The go-around decision module 18 compares the go-around rules 18 with the aircraft position deviation 64 to determine conformance with the rules. When there is a lack of conformance, a decision 66 is output to go-around. When the rules are complied with, a decision 66 is output to continue the approach (or there is an absence of a decision 66 to go-around). The go-around rules 18 are stored on memory of the computer vision system 10. In one example, the go-around rules are taken from the International Civil Aviation Organization (ICAO) Standards and Recommended Practices (SARPs) and are as follows:

TABLE 1

| | Go-around Threshold (> meter) | |
|---|---|---|
| | CAT I | CAT II/CAT III |
| $D_{GS}$ | 10 | 5.3 |
| $D_{LOC}$ | 40 | 17 |

The computer vision system 10 includes a cross-check module 42 for verifying whether the real world aircraft position 54 is sufficiently reasonable by comparing it with corresponding reference aircraft position data 55 from the aircraft sensors 24 and/or from the GPS module 28. In some examples, the speed vector 60 from the computer vision processing module 26 is compared to reference speed data from the aircraft sensors 24 and/or the GPS module 28 as an additional cross-check parameter. The cross-check module 42 determines whether the real world aircraft position 54 and optionally also the speed vector 60 are sufficiently close to the reference data based on thresholds. When the thresholds are breached, the real world aircraft position 54 is considered unreliable. When the real world aircraft position 54 is determined to be unreliable, the go-around decision module 30 ceases to operate and the pilot is warned that the automatic go-around decision process is no longer operational. The warning is provided through aural and/or visual indication by the output system 22. Example thresholds for the difference between the real word aircraft position and speed data 54, 60 and the reference data 55 are provided in table 2 below. When the computer vision values differ from the reference values by an amount within the thresholds, the cross-check module 42 does not interrupt the go-around decision module 30 and the automated go-around decision processes described herein continue.

| Item | Unit | Threshold CAT I | Threshold CAT II/CAT III |
|---|---|---|---|
| X | m | 20 | 15 |
| Y | m | 20 | 15 |
| Z | m | 5 | 2 |
| $V_{ns}$ | m/s | 10 | 10 |
| $V_{ew}$ | m/s | 10 | 10 |
| $V_{up}$ | m/s | 2.5 | 1 |

Whilst the computer vision system 10 is described herein as being located in the aircraft 12, it should be understood that remote or cloud processing capabilities and data sources could be used by the aircraft 12 to implement at least some parts of the computer vision system 10. As such, one or more components described with respect to the aircraft 12 may not necessarily be located onboard the aircraft 12.

Figure 2:
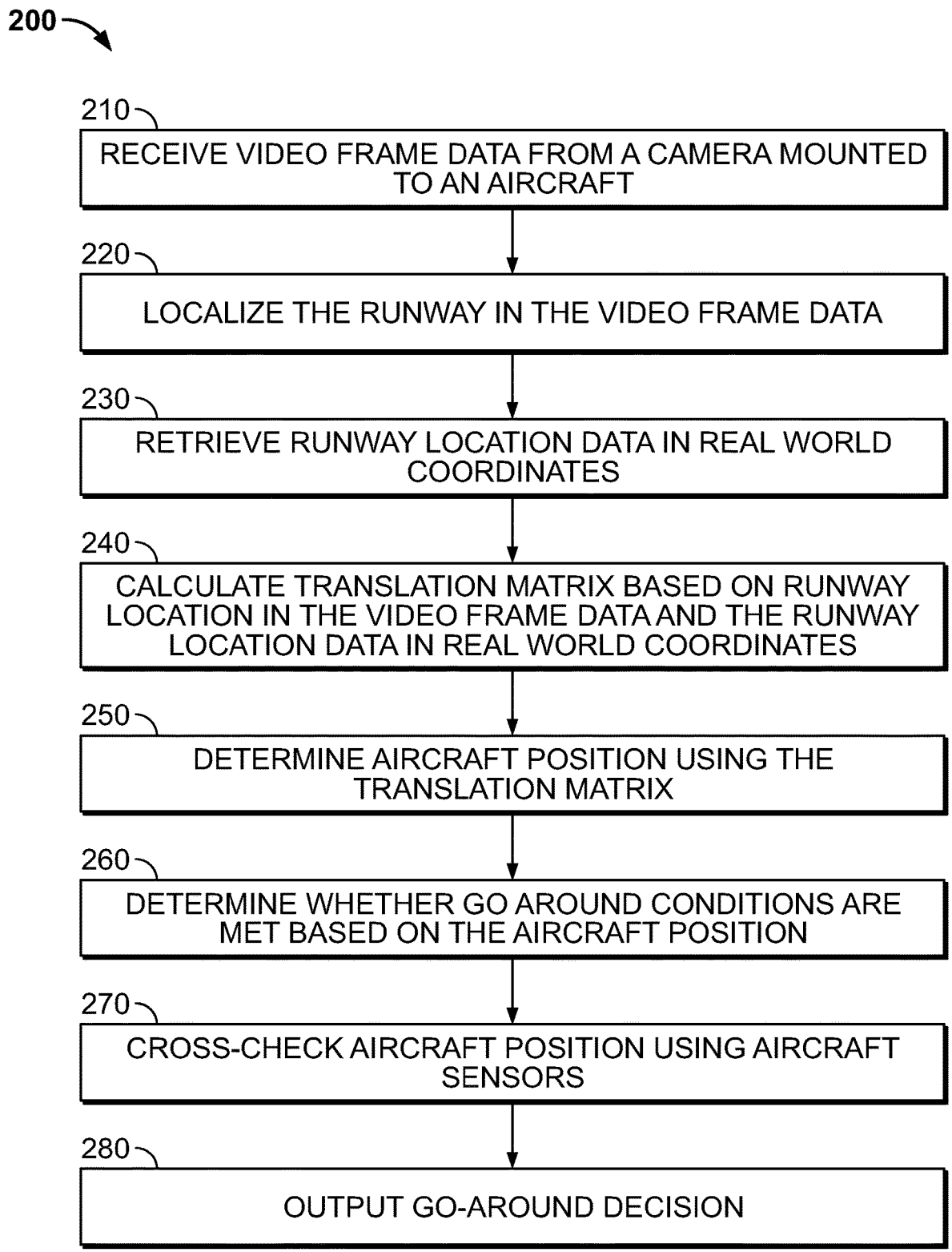
FIG. 2 is a flowchart of a computer vision method for assisting a landing decision, in accordance with the present disclosure.

FIG. 2 is a flowchart illustrating an exemplary method 200 for providing a go-around or continue approach decision 66. The decision 66 is based on computer vision processing of video frame data 50 to identify the runway and the location of the runway in camera coordinates. Based on a relation between the location of the identified runway in camera coordinates and the real world position of the runway 52, the real word aircraft position 54 can be derived from the computer vision processing. The aircraft position deviation 64 can then be determined to allow a go-around decision to be output when the deviation is too great. Steps of method 200 are performed by the computer vision system 10 of FIG. 1 (FIG. 1). Method 200 commences, in some embodiments, when the aircraft 12 is determined to be within a predetermined proximity of the target runway based on a location of the aircraft 12 from the global positioning system module 28 and/or from the aircraft sensors 24. In one embodiment, method 200 is invoked when the altitude of the aircraft 12 is less than a predetermined altitude during a landing approach. For example, when the aircraft altitude is less than 1000 feet. The aircraft altitude may be determined based on altitude data from a radio altimeter included in the aircraft sensors 24. The method 200 may repeat so as to continuously process each frame (or every n frames) of incoming video frame data 50. The method 200 may cease when the altitude of the aircraft 12 is less than a set threshold such as less than 50 feet. The method may also cease when the cross-check process indicates insufficiently reliable data is being determined by the computer vision processing module 26.

In step 210, the video frame data 50 is received from the camera 14. In step 220, the video frame data 50 is processed by the computer vision processing module 26 to localize the runway. Step 220 may include execution of an object finding algorithm that is tuned to identify and localize runways. Step 220 produces pixel positions for the identified runway, which may include one, two, three or more discrete locations on the runway. In step 230, data 52 for the real world position of the runway is retrieved from the navigation database 16. In some embodiments, the computer vision system 10 derives a target runway based on a flight plan or based on aircraft position and heading information from the GPS module 28 and/or the aircraft sensors 24 and information on the most likely runway at a nearby airport. The most likely runway can be derived from factors such as proximity and alignment, which are available from the navigation database 16.

In step 240, the translation matrix 58 is calculated based on intrinsic parameters of the camera 14, the pixel positions 56 representing the runway location in camera coordinates and the data 52 representing the position of the runway in real world coordinates from the navigation database 16. In step 250, the real world aircraft position 54 in world coordinates is determined based on the translation matrix 58 and the data 52 representing the position of the runway in real world coordinates.

In step 260, an automated decision is made as to whether go-around conditions are met based on the real world aircraft position 54 and whether a deviation between the real world aircraft position 54 and the planned flight path 62 exceed thresholds specified by go-around rules. In step 280, the go-around decision 66 (which may be a continue approach or go-around state) is output to the pilot via the output system 22 in aural and/or visual form. The pilot can then take go-around or continue approach action based on the output from step 260.

In some embodiments, the method includes step 270 in which a cross-check is carried out on the real world aircraft position 54 as compared to reference aircraft position data 55 from the aircraft sensors 24 and/or from the GPS module 28. A cross-check on the speed vector 60 may also be implemented. If the cross-check indicates that the data determined by the computer vision processing module 26 is insufficiently reliable, then method 200 may cease and the pilot makes the go-around decision without additional support from the computer vision system 10.

In a simpler embodiment, the computer vision system 10 could be used only to indicate to a pilot, through the output system 22, that visual contact has been made with the runway by processing the video frame data 50. In another embodiment, this indication could be combined with later indications concerning the go-around/continue approach decision.

Embodiments of the computer vision system 10 have been described in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The use cases and the depictions provided here are only exemplary in nature. It should be possible to use different symbology and semantics to accomplish the same concepts described herein.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. Various changes may be made in the function and arrangement of elements described in an exemplary embodiment without departing from the scope of the invention as set forth in the appended claims.

What is claimed is:

1. A computer vision system for an aircraft, comprising:
a camera mounted to the aircraft and configured to output video frame data of a scene ahead of the aircraft;
a processor in operable communication with the camera, the processor configured to execute program instructions, wherein the program instructions are configured to cause the processor to process the video frame data to:
identify a runway;
extract runway pixel positions associated with the runway;
determine the aircraft position in a real world coordinate frame based on the pixel positions;
receive predefined aircraft position data and go-around rules for a compliant approach to the runway;
calculate an aircraft position deviation based on the aircraft position and the predefined aircraft position data;
determine whether the aircraft position deviation is in conformance with the go-around rules; and
output an indication of conformity with the go-around rules,
wherein the program instructions are further configured to cause the at least one processor to:
receive reference aircraft position data from an aircraft sensor system;
cross-check the aircraft position with the reference aircraft position data; and
when the cross-check indicates a discrepancy beyond a threshold, outputting a warning and discontinuing determining whether the aircraft position deviation is in conformance with the go-around rules based on the video frame data.

2. The computer vision system of claim 1, wherein the program instructions are configured to cause the at least one processor to:
determine the aircraft position in the real world coordinate frame based on the pixel positions by:
retrieving location data for a runway in the real world coordinate frame from an airport database;
calculating a translation matrix based on the runway pixel positions and the location data; and
determining the aircraft position in the real world coordinate frame based on the translation matrix.

3. The computer vision system of claim 1, wherein:
the predefined aircraft position data includes a predefined glide slope;
the aircraft position includes an aircraft elevation and a longitudinal position of the aircraft; the program instructions are configured to:
determine a predefined aircraft elevation based on the predefined glide slope and the longitudinal position of the aircraft;
calculate a glide slope deviation based on the predefined aircraft elevation and the aircraft elevation; and
determine whether the glide slope deviation is in conformance with the go-around rules.

4. The computer vision system of claim 1, wherein:
the aircraft position includes a lateral position of the aircraft;

the predefined aircraft position data includes a predefined lateral position; the program instructions are configured to:
  calculate a lateral position deviation based on the predefined lateral position and the lateral position of the aircraft; and
  determine whether the lateral position deviation is in conformance with the go-around rules.

5. The computer vision system of claim 1, wherein the runway pixel positions comprise at least three runway pixel positions.

6. The computer vision system of claim 1, wherein the reference aircraft position data is received from a global positioning system.

7. An aircraft, comprising:
a camera mounted to the aircraft and configured to output video frame data of a scene ahead of the aircraft;
a navigation database;
a processor in operable communication with the camera and the navigation database, the processor configured to execute program instructions, wherein the program instructions are configured to cause the processor to:
  identify a runway based on the video frame data;
  extract runway pixel positions associated with the identified runway;
  determine the aircraft position in a real world coordinate frame based on the pixel positions and a real world position of the runway retrieved from the navigation database;
  receive predefined aircraft position data and go-around rules for a compliant approach to the runway;
  calculate an aircraft position deviation based on the determined aircraft position and the predefined aircraft position data;
  determine whether the aircraft position deviation is in conformance with the go-around rules; and
  output an indication of conformity with the go-around rules,
    wherein the program instructions are configured to cause the at least one processor to:
  receive reference aircraft position data from an aircraft sensor system;
  cross-check the aircraft position with the reference aircraft position data; and
  when the cross-check indicates a discrepancy beyond a threshold, outputting a warning and discontinuing determining whether the aircraft position deviation is in conformance with the go-around rules based on the video frame data.

8. The aircraft of claim 7, wherein the program instructions are configured to cause the at least one processor to:
  determine the aircraft position in the real world coordinate frame based on the pixel positions by:
    calculate a translation matrix based on the runway pixel positions and the real world position of the runway retrieved from the navigation database; and
    determine the aircraft position in the real world coordinate frame based on the translation matrix.

9. The aircraft of claim 7, wherein:
the predefined aircraft position data includes a predefined glide slope;
the aircraft position includes an aircraft elevation and a longitudinal position of the aircraft; the program instructions are configured to:
  determine a predefined aircraft elevation based on the predefined glide slope and the longitudinal position of the aircraft;
  calculate a glide slope deviation based on the predefined aircraft elevation and the aircraft elevation; and
  determine whether the glide slope deviation is in conformance with the go-around rules.

10. The aircraft of claim 7, wherein:
the aircraft position includes a lateral position of the aircraft;
the predefined aircraft position data includes a predefined lateral position; the program instructions are configured to:
  calculate a lateral position deviation based on the predefined lateral position and the lateral position of the aircraft; and
  determine whether the lateral position deviation is in conformance with the go-around rules.

11. The aircraft of claim 7, wherein the runway pixel positions comprise at least three runway pixel positions.

12. The computer vision system of claim 7, wherein the reference aircraft position data is received from a global positioning system.

13. A method for aiding a landing decision for an aircraft, the method comprising:
  receiving, via at least one processor, video frame data from a camera mounted to the aircraft;
  identifying, via the at least one processor, a runway based on the video frame data and by using an object detection algorithm;
  extracting, via the at least one processor, runway pixel positions associated with the identified runway;
  determining, via the at least one processor, the aircraft position in a real world coordinate frame based on the pixel positions, intrinsic camera parameters, and a real world position of the runway retrieved from the navigation database;
  receiving, via the at least one processor, predefined aircraft position data and go-around rules for a compliant approach to the runway;
  calculating, via the at least one processor, an aircraft position deviation based on the determined aircraft position and the predefined aircraft position data;
  determining, via the at least one processor, whether the aircraft position deviation is in conformance with the go-around rules; and
  outputting, via the at least one processor, an indication of conformity with the go-around rules; and further comprising:
  receiving, via the at least one processor, reference aircraft position data from an aircraft sensor system;
  cross-checking, via the at least one processor, the aircraft position with the reference aircraft position data; and
  when the cross-check indicates a discrepancy beyond a threshold, outputting, via the at least one processor, a warning and discontinuing determining whether the aircraft position deviation is in conformance with the go-around rules based on the video frame data.

14. The method of claim 13, comprising:
  determining, via the at least one processor, the aircraft position in the real world coordinate frame based on the pixel positions by:
    calculating a translation matrix based on the runway pixel positions and the real world position of the runway retrieved from the navigation database; and
    determining the aircraft position in the real world coordinate frame based on the translation matrix.

15. The method of claim 13, wherein:
the predefined aircraft position data includes a predefined glide slope;
the aircraft position includes an aircraft elevation and a longitudinal position of the aircraft; the method comprising:
   determining, via the at least one processor, a predefined aircraft elevation based on the predefined glide slope and the longitudinal position of the aircraft;
   calculating, via the at least one processor, a glide slope deviation based on the predefined aircraft elevation and the aircraft elevation; and
   determining, via the at least one processor, whether the glide slope deviation is in conformance with the go-around rules.

16. The method of claim 13, wherein:
the aircraft position includes a lateral position of the aircraft;
the predefined aircraft position data includes a predefined lateral position; the method comprising:
   calculating, via the at least one processor, a lateral position deviation based on the predefined lateral position and the lateral position of the aircraft; and
   determining, via the at least one processor, whether the lateral position deviation is in conformance with the go-around rules.

17. The method of claim 13, wherein the runway pixel positions comprise at least three runway pixel positions.

\* \* \* \* \*